United States Patent
Badwal et al.

(10) Patent No.: US 9,895,652 B2
(45) Date of Patent: Feb. 20, 2018

(54) PROCESSES UTILISING SELECTIVELY PERMEABLE MEMBRANES

(71) Applicant: Commonwealth Scientific and Industrial Research Organisation, Campbell (AU)

(72) Inventors: Sukhvinder Badwal, Campbell (AU); Sarbjit Singh Giddey, Campbell (AU); Fabio Tomasco Ciacchi, Campbell (AU); Aniruddha Kulkarni, Campbell (AU); Anthony E. Hughes, Olinda (AU); Danielle Frances Kennedy, Glen Waverley (AU)

(73) Assignee: Commonwealth Scientific and Industrial Research Organisation, Campbell (AU)

( * ) Notice: Subject to any disclaimer, the term of this patent is extended or adjusted under 35 U.S.C. 154(b) by 29 days.

(21) Appl. No.: 14/911,632

(22) PCT Filed: Aug. 14, 2014

(86) PCT No.: PCT/AU2014/000809
§ 371 (c)(1),
(2) Date: Feb. 11, 2016

(87) PCT Pub. No.: WO2015/021501
PCT Pub. Date: Feb. 19, 2015

(65) Prior Publication Data
US 2016/0193564 A1   Jul. 7, 2016

(30) Foreign Application Priority Data
Aug. 14, 2013 (AU) .................. 2013903065

(51) Int. Cl.
*B01D 53/22* (2006.01)
*B01D 69/02* (2006.01)
(Continued)

(52) U.S. Cl.
CPC ....... *B01D 53/228* (2013.01); *B01D 67/0072* (2013.01); *B01D 67/0088* (2013.01);
(Continued)

(58) Field of Classification Search
CPC .. B01D 53/22; B01D 53/228; B01D 67/0072; B01D 67/0088; B01D 69/145;
(Continued)

(56) References Cited

U.S. PATENT DOCUMENTS 4,865,630 A * 9/1989 Abe ...................... B01J 19/2475
                                                          422/180
5,215,729 A * 6/1993 Buxbaum .............. B01D 53/22
                                                          423/248

(Continued)

FOREIGN PATENT DOCUMENTS

JP      2000-247632 A      9/2000
JP      2005-89226    *    4/2005 ............ B01D 53/22
(Continued)

OTHER PUBLICATIONS

English language machine translation of JP2005-89226. Retrieved from http://translationportal.epo.org on May 10, 2017.*
(Continued)

*Primary Examiner* — Jason M Greene
(74) *Attorney, Agent, or Firm* — Brinks Gilson & Lione

(57) ABSTRACT

The present invention relates to processes utilizing hydrogen species selectively permeable membranes for synthesis of products. The present invention also relates to processes for synthesizing products from hydrogen insertion or hydrogenation reactions utilizing hydrogen species permeable membranes. The present invention also relates to processes for synthesizing ammonia utilizing hydrogen species selectively permeable membranes. The membranes provide surfaced modified membranes that can comprise a porous layer
(Continued)

containing a plurality of reactive sites comprising a metal species and a catalyst for promoting a reaction within the layer.

18 Claims, 8 Drawing Sheets

(51) Int. Cl.
| | |
|---|---|
| *B01D 69/14* | (2006.01) |
| *B01D 71/02* | (2006.01) |
| *C01C 1/04* | (2006.01) |
| *B01J 35/06* | (2006.01) |
| *B01J 19/24* | (2006.01) |
| *B01J 23/89* | (2006.01) |
| *B01D 67/00* | (2006.01) |

(52) U.S. Cl.
CPC .......... *B01D 69/02* (2013.01); *B01D 69/145* (2013.01); *B01D 71/022* (2013.01); *B01D 71/024* (2013.01); *B01J 19/2475* (2013.01); *B01J 23/8906* (2013.01); *B01J 35/065* (2013.01); *C01C 1/0411* (2013.01); *B01D 2325/06* (2013.01); *B01D 2325/10* (2013.01); *B01J 2219/00162* (2013.01); *B01J 2219/24* (2013.01); *Y02P 20/52* (2015.11)

(58) Field of Classification Search
CPC .............. B01D 71/022; B01D 2256/16; B01D 2325/06; B01D 2325/10; B01J 19/2475; B01J 23/8906; B01J 35/065; C01C 1/0405; C01C 1/0411

See application file for complete search history.

(56) References Cited

U.S. PATENT DOCUMENTS

| | | | |
|---|---|---|---|
| 5,512,263 A | | 4/1996 | McIntyre |
| 7,314,544 B2 | | 1/2008 | Murphy et al. |
| 7,771,520 B1 | * | 8/2010 | Bossard ............... B01D 53/228 423/644 |
| 2003/0164305 A1 | | 9/2003 | Denvir et al. |
| 2007/0248874 A1 | * | 10/2007 | Aoyama .............. B01D 71/022 429/411 |
| 2008/0268314 A1 | * | 10/2008 | Han .................... H01M 4/8621 429/481 |
| 2011/0182797 A1 | * | 7/2011 | Wilcox ................ B01D 53/228 423/359 |
| 2011/0286907 A1 | | 11/2011 | Nakamura et al. |
| 2016/0288114 A1 | * | 10/2016 | Way ...................... B01J 35/065 |

FOREIGN PATENT DOCUMENTS

| | | |
|---|---|---|
| JP | 2005-089226 A | 4/2005 |
| JP | 2006-110419 A | 4/2006 |
| WO | WO 2010/079726 A1 | 7/2010 |

OTHER PUBLICATIONS

Sirkar, Kamalesh K. et al., "Membrane in a Reactor: A Functional Perspective", Ind. Eng. Chem. Res., 38, 1999, pp. 3715-3737.*
International Search Report for corresponding International application No. PCT/AU2014/000809, dated Oct. 31, 2014.
Written Opinion of the International Searching Authority for corresponding International application No. PCT/AU2014/000809, dated Oct. 31, 2014.
Extended European Search Report, for corresponding European application No. 14836623.0, dated Feb. 13, 2017.
Kamalesh K. Sirkar et al., "Membrane in a Reactor: A Functional Perspective," *Industrial & Engineering Chemistry Research*, vol. 38, No. 10, Oct. 1, 1999, pp. 3715-3737.
W.B. Wang, et al., "Ammonia synthesis at atmospheric pressure using a reactor with thin solid electrolyte $BaCe_{0.85}Y_{0.15}O_{3-\alpha}$ membrane," *Journal of Membrane Science*, vol. 360, Issues 1-2, Sep. 15, 2010, pp. 397-403, ISSN 0376-7388.
Rong Lan, et al., "Synthesis of ammonia directly from air and water at ambient temperature and pressure," Jan. 29, 2013, *Scientific Reports* 2013, 3:1145, pp. 1-7.

* cited by examiner

PROCESSES UTILISING SELECTIVELY PERMEABLE MEMBRANES

CROSS-REFERENCE TO RELATED APPLICATIONS

This application is the U.S. National Stage application of PCT Application No. PCT/AU2014/000809, filed on Aug. 14, 2014, which claims priority to Australian Patent Application No. 2013903065, filed Aug. 14, 2013.

FIELD

The present invention relates to processes utilising hydrogen species selectively permeable membranes for synthesis of products. The present invention also relates to processes for synthesising products from hydrogen insertion or hydrogenation reactions utilising hydrogen species permeable membranes. The present invention also relates to processes for synthesising ammonia utilising hydrogen species selectively permeable membranes. The present invention also relates to various systems, membranes and reactors, which may be associated with the processes.

BACKGROUND

Over 100 million tons of ammonia is produced per annum using about 2% of the world's energy consumption. Ammonia is used mainly in the fertiliser industry (>80%) and for industrial processes (20%) as a source of nitrogen. Ammonia is produced at present through the Haber-Bosch process, which is an energy intensive process requiring hydrogen and nitrogen to react (i.e. $3H_2+N_2 \rightarrow 2NH_3$) on an iron based catalyst at high temperatures (up to 500° C.) and high pressure (up to 300 bar). This reaction is exothermic and has a negative entropy change that requires high temperatures (kinetics) and high pressures for the reaction to proceed at reasonable rates, and there is only 10-15% conversion of reactants at each stage. Consequently, the step is repeated a number of times. The total energy consumption by this route is very high at 9500 kwh/ton of ammonia produced (12000 kwh/ton if $H_2$ is produced via electrolysis rather than via natural gas reforming).

Other methods of producing ammonia include electrochemical based processes. The electrochemical route for production of ammonia can save more than 20% of the energy consumed as compared to the Haber-Bosch process, although still requires relatively high energy input and also suffers from low conversion rates. Hydrogen can be sourced from natural gas reforming or electrolysis of water, or can be produced in situ by electrolysis of water or decomposition of an organic solvent such as ethanol. The process can be carried out under ambient conditions or at higher temperatures depending on the type of the electrolyte material used.

There is a need to find an alternative route for ammonia synthesis that can reduce the severity of the process conditions, lower the energy consumption per unit of ammonia produced, and enhance the ammonia conversion rates.

Other industrially important chemical processes include hydrogen peroxide synthesis from oxygen and hydrogen, and hydrocarbon synthesis from carbon monoxide or carbon dioxide and hydrogen. Such processes either involve catalysed reactions operating at high temperatures and pressures, or direct or indirect electrochemical processes that also require a high energy input.

The above industrial processes are extremely energy intensive have low efficiency and energy recycling is poor.

There is thus a need to identify novel processes for large scale synthesis of products at reduced energy inputs.

SUMMARY

The present applicant has identified a number of solutions to the problems identified above. This has led to the development of various processes, permeable membranes, reactors and systems, for the synthesis of products. It is noted that some features of the processes, membranes, reactors or systems identified in some aspects and embodiments are not required in all aspects and embodiments described herein, and this specification should be read in this context. It will also be appreciated that in the various aspects and embodiments the order of process steps may not be essential and can be varied.

Processes have been identified for synthesising products using hydrogen species selectively permeable solid membranes (HSPM) having a hydrogen species receiving side and a product synthesis side for reaction of a first reactant of a hydrogen species with a second reactant, wherein at least the product synthesis side of the membrane has been surface modified.

The surface modification can comprise an outer layer that is porous to the second reactant and contains a plurality of reactive sites comprising a metal species and a catalyst for promoting a reaction within the outer layer between the first and second reactants. The surface modification may be provided by at least one of:
 a. a roughened surface comprising a catalyst;
 b. a catalyst composition intercalated, interspersed or embedded with the HSPM; and
 c. a coating comprising a catalyst and a hydrogen species permeable metal, metal alloy, cermet or metal oxide thereof.

In a first aspect, there is provided a process for synthesis of a product by reaction of at least a first reactant comprising a hydrogen species with a second reactant, the process comprising:
 (i) providing a hydrogen species selectively permeable solid membrane (HSPM) having a hydrogen species receiving side and a product synthesis side;
 (ii) providing a hydrogen species source at the hydrogen species receiving side;
 (iii) providing a second reactant source at the product synthesis side;
 (iv) providing a concentration gradient or a partial pressure differential of the hydrogen species source across the HSPM such that the concentration of hydrogen is lower on the product synthesis side than on the hydrogen species receiving side to thereby effect migration of the hydrogen species through the HSPM for reaction with the second reactant at or near the surface of the product synthesis side;

wherein at least the product synthesis side of the HSPM has a surface modification comprising a layer that is porous to the second reactant and contains a plurality of reactive sites comprising a metal species and a catalyst for promoting a reaction within the outer layer between the first and second reactants to form the product.

In an embodiment or another aspect, there is provided a process for synthesis of a product by reaction of at least a first reactant comprising a hydrogen species with a second reactant, the process comprising the steps of:
 (i) providing a hydrogen species selectively permeable solid membrane (HSPM) having a hydrogen species receiving side and a product synthesis side;

(ii) providing a hydrogen species source at the hydrogen species receiving side;

(iii) providing a second reactant source at the product synthesis side;

(iv) providing a concentration gradient or a partial pressure differential of the hydrogen species source across the HSPM such that the concentration of hydrogen is lower on the product synthesis side than on the hydrogen species receiving side to thereby effect migration of the hydrogen species through the HSPM for reaction with the second reactant at or near the surface of the product synthesis side;

wherein at lent the product synthesis side of the HSPM has a surface modification provided by at least one of:

a. a roughened surface comprising a catalyst, the roughened surface being an outer layer of the HSPM and/or a layer deposited on the HSPM comprising a hydrogen species permeable metal, metal alloy, cermet or metal oxide thereof;

b. a catalyst composition intercalated, interspersed or embedded with the HSPM, wherein the catalyst composition comprises a catalyst and optionally a hydrogen species permeable metal, metal alloy, cermet or metal oxide thereof; and c. a coating comprising a catalyst and a hydrogen species permeable metal, metal alloy, cermet or metal oxide thereof.

In one embodiment, the surface modification is provided by a roughened surface comprising a catalyst, the roughened surface being an outer layer of the HSPM and/or a further layer deposited on the HSPM comprising a hydrogen species permeable metal, metal alloy, cermet or metal oxide thereof. The further layer may be formed from a hydrogen permeable material selected from the group consisting of palladium, titanium and nickel, an alloy of palladium, titanium, vanadium, zirconium, niobium, tantalum or alloys of one or more from this group with silver, copper, chromium, iron, nickel or cobalt, and a cermet thereof. In another embodiment, the further layer is formed from a palladium metal or alloy. The roughened surface may be formed in situ during casting of the HSPM, or by subsequent mechanical or chemical abrasion of a HSPM surface. The roughened surface may be a metal sputtered surface. In an embodiment, the metal sputtered surface is a palladium sputtered surface. The sputtered layer may be provided by process of deposition or modification of the surface for a metal membrane. The thickness of the roughened surface, such as a metal sputtered or metal deposited layer on the HSPM, may be between any one of the following ranges (in nm) about 10 and 5000, about 15 to 2500, about 20 and 1000, about 30 and 750, about 40 and 500, or about 50 and 300.

In another embodiment, the surface modification is provided by a catalyst composition intercalated, interspersed or embedded with the HSPM, wherein the catalyst composition comprises a catalyst and optionally a hydrogen species permeable metal, metal alloy, cermet or metal oxide thereof.

In another embodiment, the surface modification is provided by a coating comprising a catalyst and a hydrogen species permeable metal, metal alloy, cermet or metal oxide thereof. The thickness of the coating may be between (in µm) about 10 and 2000, about 15 and 1000, about 20 and 500, about 25 and 400, about 30 and 300, about 40 and 200, or about 50 and 150.

The hydrogen species permeable metal, metal alloy, cermet or metal oxide thereof may be selected from the group consisting of palladium, titanium and nickel. In an embodiment, the hydrogen species permeable metal, metal alloy, cermet or metal oxide thereof is selected from at least one of palladium and palladium oxide.

The HSPM may be formed from a hydrogen permeable material selected from the group consisting of palladium, titanium and nickel, an alloy of palladium, titanium, vanadium, zirconium, niobium, tantalum or alloys of one or more from this group with silver, copper, chromium, iron, nickel or cobalt, and a cermet thereof. In one embodiment, the HSPM is a hydrogen permeable palladium membrane.

The second reactant source may be a nitrogen species source provided in a process for synthesizing ammonia. In an embodiment, the catalyst is an ammonia synthesis catalyst comprising an iron oxide based catalyst. The ammonia synthesis catalyst may be selected from at least one of Wüstite and hematite.

In another embodiment, the temperature of the process may be in a range of between about 100 to 800° C., about 150 to 700° C., about 400 to 600° C. or about 450 to 550° C. In another embodiment, the pressure (in bar) on the hydrogen species receiving side of the membrane may be in a range of about 1 to 20. The pressure on the product synthesis side of the membrane may be in the range of about 1 to 100 bar. In another embodiment, the partial pressure differential between the hydrogen species receiving side of the membrane and the product synthesis side of the membrane may be in a range of about 2:1 bar, 3:2 bar, 4:3 bar, 5:4 bar, 6:5 bar, or 7:6 bar, respectively.

In a second aspect, there is provided a hydrogen species selectively permeable solid membrane (HSPM) formed from a hydrogen permeable material selected from the group consisting of palladium, titanium and nickel, an alloy of palladium, titanium, vanadium, zirconium, niobium, tantalum or alloys of one or more from this group with silver, copper, chromium, iron, nickel or cobalt, and a cermet thereof, wherein at least one side of the membrane, or portion thereof, comprises a surface modification comprising a layer that is porous and contains within the layer a plurality of reactive sites comprising a metal species and a catalyst.

It will be appreciated that the catalyst is for promoting a reaction within the layer between two or more reactants. In an embodiment, the HSPM is for producing ammonia from a pressure driven system by reaction of a first reactant, provided by a hydrogen species source, with a second reactant, provided by a nitrogen species source, wherein the surface modification comprises a layer that is porous to the second reactant and contains a plurality of reactive sites comprising a metal species and a catalyst for promoting a reaction within the layer between the first and second reactants to form the product.

In an embodiment or another aspect, there is provided a hydrogen species selectively permeable solid membrane (HSPM) formed from a hydrogen permeable material selected from the group consisting of palladium, titanium and nickel, an alloy of palladium, titanium, vanadium, zirconium, niobium, tantalum or alloys of one or more from this group with silver, copper, chromium, iron, nickel or cobalt, and a cermet thereof, wherein at least one side of the membrane, or portion thereof, comprises a surface modification provided by at least one of:

a. a roughened surface comprising a catalyst, the roughened surface being an outer layer of the HSPM and/or a layer deposited on the HSPM comprising a hydrogen species permeable metal, metal alloy, cermet or metal oxide thereof;

b. a catalyst composition intercalated, interspersed or embedded with the HSPM, wherein the catalyst composition comprises a catalyst and optionally a hydrogen species permeable metal, metal alloy, cermet or metal oxide thereof; and c. a coating comprising a catalyst and a hydrogen species permeable metal, metal alloy, cermet or metal oxide thereof.

In an embodiment or another aspect, there is provided a hydrogen species selectively permeable solid membrane (HSPM) for producing ammonia from a pressure driven system by reaction of permeable hydrogen species source with a nitrogen species source, wherein the membrane is formed from a hydrogen permeable material selected from the group consisting of palladium, titanium and nickel, an alloy of palladium, titanium, vanadium, zirconium, niobium, tantalum or alloys of one or more from this group with silver, copper, chromium, iron, nickel or cobalt, and a cermet thereof, and the membrane further comprises a surface modification comprising a layer that is porous to the nitrogen species source and contains within the layer a plurality of reactive sites comprising a metal species and a catalyst for promoting a reaction within the layer between the hydrogen species and the nitrogen species for forming ammonia.

It will be appreciated that embodiments as described herein in relation to the first aspect can also provide embodiments for the membrane according to the second or above aspects.

In a third aspect, there is provided a reactor for synthesis of a product by reaction of at least a first reactant comprising a hydrogen species with a second reactant, the reactor comprising:

a first chamber section and a second chamber section separated by a hydrogen species selectively permeable solid membrane (HSPM) configured to provide a hydrogen species receiving side of the membrane in the first chamber section and a product synthesis side of the membrane in the second chamber section, wherein the HSPM is a surface modified membrane according to the first or second aspects as described herein, including embodiments thereof;

a first reactant inlet for supply of a first reactant source of a hydrogen species to the first chamber section;

a second reactant inlet for supply of a second reactant source to the second chamber section; and a first outlet for obtaining at least a product of the reaction.

In a fourth aspect, there is provided a system for synthesis of a product by reaction of at least a first reactant comprising a hydrogen species with a second reactant, the system comprising:

a reactor according to the third aspect as described herein, including embodiments thereof; and a control means to control the concentration or partial pressure of hydrogen to be lower on the product synthesis side than on the hydrogen species receiving side, to thereby effect migration of the hydrogen species through the membrane to the product synthesis side for reaction with the second reactant to form the product.

It will be appreciated that embodiments of the process and/or membrane as described in relation to the first and/or second aspects may apply in relation to the reactor according to the third aspect or system according to the fourth aspect.

BRIEF DESCRIPTION OF THE DRAWINGS

Preferred embodiments of the present invention will now be further described and illustrated, by way of example only, with reference to the accompanying drawings in which:

FIGS. 1(a), (b) and (c) depict possible surface modifications of the membrane whilst FIGS. 1(d) and (e) depict in more detail the configuration that gives rise to the triple or three phase reactions sites when the catalyst is intercalated or embedded into the membrane;

DETAILED DESCRIPTION

Figure 1:
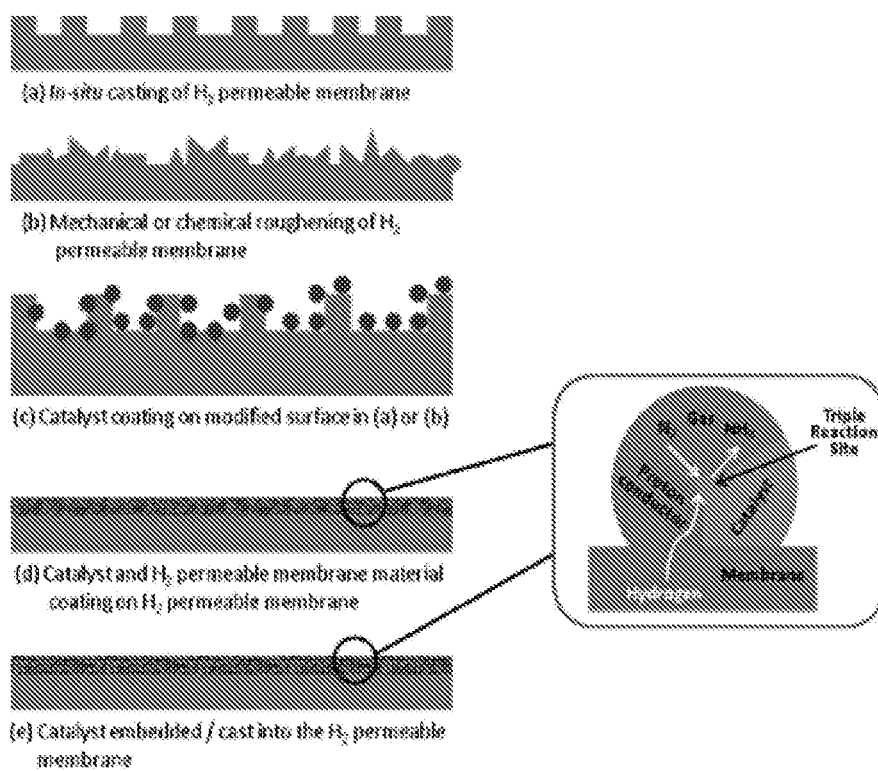
FIG. 1 provides schematic representations or variations of hydrogen pressure driven membranes used according to any one of the embodiments of the invention.

The present invention is described in the following various non-limiting embodiments, which relate to investigations undertaken to identify improved processes for synthesising products using selectively permeable solid membranes. It has been surprisingly found that applying a pressure differential across a hydrogen species selectively permeable membrane (HSPM) that is surface modified as described herein provides advantages for the synthesis of products, for example synthesis of ammonia from a hydrogen and nitrogen source. The process may be effective without application of any electrical energy. Processes described herein can provide a lower energy alternative for production or synthesis of industrial chemicals, which are currently produced by relatively high energy processes using high temperatures and pressures, such as catalytic processes or electrolytic type processes.

With reference to ammonia production, one or more of the following advantages may be provided by at least some of the embodiments described herein:

- increased efficiency with respect to energy input and higher conversion rates at less severe process conditions;
- hydrogen can be sourced from natural gas reforming, coal gasification, biomass or by water electrolysis;
- hydrogen feedstock containing gases such as $CO_2$ may be used for ammonia synthesis without the need for further gas cleaning;
- flexibility can be achieved in controlling hydrogen flux through the membrane (temperature, membrane type and thickness, and differential pressure across the membrane) to enable enhanced hydrogen conversion rates;
- pressure driven and low differential pressure operation provides a relatively low energy alternative to current energy intensive processes.
- hydrogen feedstock costs can be significantly reduced by integrating a water-gas-shift reaction ($H_2O+CO=H_2+CO_2$), hydrogen/$CO_2$ gas separation processes in a reactor according, to the process, as opposed to sourcing hydrogen from a natural gas reformer or water electrolyser.

Terms

The term "HSPM" as used herein refers to a hydrogen species selectively permeable solid membrane that can permit the migration of a hydrogen species through the membrane.

The term "mobile hydrogen species" as used herein refers to one or more species of hydrogen that are capable of selective migration through the HSPM membrane, such as atomic hydrogen, which includes a positive or negatively charged (hydride) species of hydrogen. It will be appreciated that the "mobile hydrogen species" will depend on the selected membrane and type of process being undertaken.

The term "surface modification", "surface modified" or like term, in relation to the membrane refers to a modification or treatment of at least part of the surface to provide a layer that is porous to the reactant species and contains a plurality of reactive sites comprising a metal species and a catalyst for promoting a reaction within the layer between the reactant species. The "surface modification" is such as to produce a three dimensional layer on the surface comprising a substantial surface area therein that is available for a catalysed reaction between first and second reactants. The term "reaction sites" refers to a plurality of sites within the layer wherein each site comprises a metal species capable of providing, conducting or transporting a first reactant of a mobile hydrogen species, and further comprises a catalyst material for promoting a reaction within the layer between the first and second reactants.

HSPM Membrane

According to the invention described herein, the processes and reactions may be carried out using a hydrogen species selectively permeable membrane (HSPM), for example a solid membrane that is selectively permeable to a mobile hydrogen species for reaction with a second reactant. The membrane comprises a hydrogen species receiving side and a product synthesis side. A hydrogen species source comprising a mobile hydrogen species can be provided to the hydrogen species receiving side and a second reactant source can be provided to the product synthesis side of the membrane. It has been found that the migration of a hydrogen species across a HSPM membrane to a product synthesis side that has been surface modified can result in an effective reaction with a second reactant source to provide a desired product.

It will be appreciated that the hydrogen species source can provide a source of a first reactant in the form or species that can migrate through the membrane, or at least a source capable of conversion in situ into a form or species that can migrate through the membrane. For example, a hydrogen species source may comprise or consist of molecular hydrogen. Molecular hydrogen may in situ undergo dissociation at or near the surface of the membrane to provide mobile hydrogen species capable of migration through the membrane. It will be appreciated that the mobile hydrogen species may be a positively and/or negatively charged species, such as a hydride or proton, which may depend on the selected membrane and type of process being undertaken.

The HSPM membrane, or substrate thereof, may be formed from materials selected from at least one of the following:

- one or more hydrogen transporting metals, for example palladium (Pd), titanium (Ti) and nickel (Ni);
- one or more alloys of hydrogen transporting metals, for example alloys of palladium including palladium-silver (Pd—Ag) alloy, palladium-copper (Pd—Cu) alloy, palladium-iron (Pd—Fe) alloy, palladium-ruthenium (Pd—Ru) alloy, palladium-cobalt-molybdenum (Pd—Co—Mo) alloy; or alloys of hydrogen transporting metals with one or more transition metals including V, Nb, Ta and Zr;
- one or more cermets, which may comprise at least one of the above metals or alloys and a ceramic, for example a proton conducting ceramic, which may provide advantages of structural stability and enhanced hydrogen transfer or a nonconducting ceramic which may provide advantages of structural stability.

In an embodiment, the HSPM membrane is formed from a hydrogen permeable material selected from the group consisting of palladium, titanium and nickel, an alloy of palladium, titanium, vanadium, zirconium, niobium, tantalum or alloys of one or more from this group with silver, copper, chromium, iron, nickel or cobalt, and a cermet thereof. In yet a further embodiment, the HSPM membrane is formed from a hydrogen permeable material selected from the group consisting of palladium and an alloy of palladium with one or more of silver, copper, chromium, iron, nickel and cobalt.

In another embodiment, the membrane materials are selected from Pd or a Pd alloy, such as Pd—Cu alloy and Pd—Ag alloy, or a Pd alloy including a transition metal selected from at least one of V, Zr, Ta and Nb.

The thickness of the membrane (without surface modification) may be selected depending on the process and reaction being undertaken. The thickness of the membrane may be between any one of the following ranges (in µm) about 10 and 500, about 20 and 400, about 30 and 300, about 40 and 200, or about 50 and 150. The thickness of the membrane may be at least about 10 µm, 30 µm, 50 µm, 70 µm, or 90 µm. The thickness of the membrane may be less than about 800 µm, 600 µm, 400 µm, or 200 µm.

Surface Modification

The surface modification of the HSPM membrane has been surprisingly shown to enhance reaction rates at the membrane surface, particularly where the surface modification is provided on at least the product synthesis side of the membrane. Surface modification may be provided on one or both sides of the membrane, or at least a portion thereof.

The surface modification can comprise a layer that is porous to the second reactant and contains a plurality of reactive sites comprising a metal species and a catalyst for promoting a reaction at least internally within the layer between the first and second reactants. For example, the surface modification may be provided by at least one of:
a. a roughened surface comprising a catalyst;
b. a catalyst composition intercalated, interspersed or embedded with the HSPM; and
c. a coating comprising a catalyst and a hydrogen species permeable metal, metal alloy, cermet or metal oxide thereof.

The surface modified layer typically provides an outer layer of the membrane. The surface modification can provide a layer to the membrane that is porous to the second reactant species and contains a plurality of reactive sites comprising a metal species and a catalyst for promoting a reaction within the outer layer between the reactant species. For example, the reactive sites promoting the reaction are provided at least internally within the layer, although it will be appreciated that reactive sites will also be provided on the surface of the layer itself. The surface modification can provide a three dimensional layer on the surface of the membrane comprising a substantial surface area (e.g. internally and externally in the layer itself) that is available for a catalysed reaction between first and second reactants. Although not wishing to be bound by any theory, it is understood that each of the reaction sites throughout the surface modified layer comprises a metal species capable of providing, conducting or transporting a first reactant of a mobile hydrogen species, and further comprising a catalyst material for promoting a reaction within the outer layer (e.g. internally and externally) between the first and second reactants, for example each site enables a second reactant to react with the first reactant (mobile hydrogen spedes) in proximity of the catalyst. It will be appreciated that the metal species may be a hydrogen species permeable metal, metal alloy, cermet or oxide thereof, for example palladium and/or palladium oxide.

In relation to an HSPM that is not surface modified as described herein, the surface modification can provide a substantial surface area within the surface modified layer that is available for the catalysed reaction between the reactant species. For example, the catalysed reaction between the first and second reactants can take place within a three dimensional structure (e.g. within the outer layer) in which the available sites for synthesis of the product are significantly increased as compared with a coating of catalyst on a planar HSPM surface. The latter would essentially comprise only a planar interface between the catalyst and HPSM that would be available for catalysed reactions. The substantial surface area that is available for catalysed reaction may comprise the interface between a catalyst phase and a hydrogen permeable phase. The interface should be accessible by the second reactant so that it can react with the hydrogen species to produce the product.

For embodiments relating to ammonia synthesis, it will be appreciated that the second reactant source can be a nitrogen species source. In such embodiments, the catalyst can be an ammonia synthesis catalyst comprising an iron oxide based catalyst, for example Wüstite or hematite.

Further details and embodiments of the surface modification are described as follows:
a. Roughened Surface Comprising Catalyst The surface modification can be provided by a roughened surface comprising a catalyst. The roughened surface may be an outer layer of the HSPM or a further layer deposited on the HSPM comprising a hydrogen species permeable metal.

The further layer may be formed from a hydrogen permeable material according to any of the embodiments described above for the HSPM. For example, the further layer can be selected from the group consisting of palladium, titanium, vanadium, zirconium, niobium, tantalum or alloys of one or more from this group with silver, copper, chromium, iron, nickel or cobalt, and a cermet thereof. In another embodiment, the further layer is formed from a palladium metal or alloy. For example, a further deposition or layer of metals or alloys may be provided on the HSPM membrane (i.e. on the hydrogen transporting metal, alloy, ceramic, or cermet). In an embodiment, the membrane comprises a deposition layer or film of Pd, Pd—Cu alloy or Pd—Ag alloy on the HSPM.

The roughened surface may be formed in situ during casting of the HSPM, or by subsequent mechanical or chemical abrasion of a HSPM surface. The roughened surface may be a metal sputtered surface. In an embodiment, the metal sputtered surface is a palladium sputtered surface. For example, FIGS. 1(a) and 1(b) show diagrams in relation to surface roughening by in situ casting of the membrane and mechanical/chemical abrasion, respectively. FIG. 1(c) shows a depiction according to an embodiment as described herein where a catalyst is provided with the surface modified layer.

Surface modification, for example, may involve one or more processes to modify the actual surface, such as roughening, and/or involve depositing a metal or alloy on at least a part of the surface of the membrane, such as a further deposited (sputtered) layer. For example, surface roughening may be achieved by any process of acid treatment, heat treatment in controlled gas atmospheres, physical vapour deposition, cold spray, plasma spray, ion implantation flame spray pyrolysis electrodeposition, chemical vapor deposition, glow discharge, sputtering, and plating or by any mechanical means. The surface modification may provide one or more outer layers, for example one or more metal sputtered layers. In one embodiment, the HSPM is a surface modified membrane comprising or consisting of a substrate selected from a hydrogen transporting metal, alloy or cermet, with at least one metal sputtered layer comprising a catalyst. The metal sputtered layer may be provided by a process of deposition or modification of the surface of the substrate. The surface modification may provide a surface modified membrane comprising or consisting of a core layer having a surface modification selected from at least one of a metal sputtered surface layer and a deposited metal layer. In another embodiment, the surface modification provides a surface modified membrane having a metal sputtered surface, such as a palladium sputtered surface.

The thickness of the surface modification layer (e.g. metal deposit or sputtered layer) on the HSPM may be between any one of the following ranges (in nm) about 10 and 5000, about 15 to 2500, about 20 and 1000, about 30 and 750, about 40 and 500, or about 50 and 300. In one embodiment, the thickness (in nm) is at least about 10, 25, 50, 75, 100, 200, 300, 400, 500, 750, 1000. The thickness (in nm) may be less than about 5000, 2500, 1000, 750, 500, 400, 300, 200, 100, 75, or 50. The sputtered layer may be provided by process of deposition or modification of the surface for a metal membrane.

In another embodiment, the membrane is a surface modified hydrogen permeable palladium membrane. The surface modified hydrogen permeable palladium membrane may comprise or consist of a substrate (core layer) comprising a surface modification selected from at least one of a metal sputtered surface layer and a deposited metal layer. The surface modified membrane may further comprise one or more coatings as described herein.

The catalyst used in the layer comprising the roughened surface may be selected according to any of the embodiments of the catalyst, or composition thereof, as described herein including those under item c) below, which may apply for the catalyst as incorporated or embedded into the roughened surface or as an additional coating on the roughened surface. The catalyst can be incorporated or embedded into at least a portion of the layer comprising the roughened surface. It will be appreciated that the catalyst is incorporated (e.g. dispersed) into the layer of the roughened surface such that the layer is provided with a plurality of reactive sites. The reactive sites are located throughout the layer, for example internally within the layer as well as at the surface of the layer. This provides a substantial surface area located within the layer that promotes a reaction between the first and second reactants. A further coating comprising the catalyst, or composition thereof, can also be provided on at least a portion of the roughened surface.

b. Intercalated, Interspersed or Embedded Catalyst Composition

The surface modification can be provided by a catalyst composition that is intercalated, interspersed or embedded with the HSPM. The catalyst composition comprises a catalyst and optionally a hydrogen species permeable metal, metal alloy, cermet or metal oxide thereof.

To further facilitate high ammonia synthesis rates and hydrogen to ammonia conversion rates, the catalyst composition may further comprise hydrogen permeable membrane material in the form of metal/alloy powder or metal oxides (reduced in-situ to metal) both of which are intercalated with or interspersed with or partially embedded into the membrane. This provides a high number of reaction sites comprising hydrogen species selectively permeable solid material/membrane and ammonia synthesis catalyst to facilitate reaction between the mobile hydrogen species and the porous nitrogen species. It will be appreciated that this surface modification, such as intercalating or embedding of the catalyst material with the HSPM as shown in FIG. 1(e), can be determined by a range of instruments and methods including spectroscopy and microscopy methods, for example scanning electron microscopy. The catalyst when provided as a coating should be suitably adhered to the membrane. It will be appreciated that other non-conventional ammonia synthesis catalysts may also be suitable.

It will be appreciated that the membrane may include one or more additives to optimise the process performance. The additives may include catalysts or promoters to enhance reaction rates at the membrane surface. The one or more additives may be incorporated within the membrane per se (such as by doping) or may be separately applied to the membrane. Incorporation of catalysts and catalyst promoters into the material of the membrane may, for example, involve alloying the membrane with other metals, or by ion implant Pd surface with catalytic metals, such as Ru, Fe by one of the heat modification techniques. Promoters may include materials with a low electronegativity. Suitable promoters may be selected from alkali metals (K, Cs) and alkali earths (mostly Be). It will be appreciated that exceptions may include the rare earths (La, Ce and Sm) that have a moderately high electronegativity.

c. Coating Comprising Catalyst and Metal Species

The surface modification can be provided by a coating comprising a catalyst and a hydrogen species permeable metal, metal alloy, cermet or metal oxide thereof. The surface modified membrane may comprise one or more coatings wherein at least one coating comprises a catalyst and a hydrogen species permeable metal, metal alloy, cermet or metal oxide thereof. In an embodiment, the coating comprising a catalyst and a hydrogen species permeable metal, metal alloy, cermet or metal oxide thereof, provides at least an outer coating to the HSPM.

The hydrogen species permeable metal, metal alloy, cermet or metal oxide thereof may be selected from the group consisting of palladium, titanium, vanadium, zirconium, niobium, tantalum or alloys of one or more from this group with silver, copper, chromium, iron, nickel or cobalt. In an embodiment, the hydrogen species permeable metal, metal alloy, cermet or metal oxide thereof is selected from at least one of palladium and palladium oxide. For example, the surface modification may be provided within a layer containing an admixture of a catalyst phase and hydrogen permeable phase on the HPSM surface. The layer may be provided by applying a coating containing the catalyst and hydrogen permeable phases (or precursoris thereof) to the HPSM surface. This is shown in FIG. 1(d). The coating may then be heated to a temperature sufficient to convert the precursor to its respective phase. Alternatively, the layer may be formed in situ during casting of the HPSM.

It will be appreciated that in embodiments relating to the synthesis of ammonia, the coating provides a layer that is porous to the second reactant of the nitrogen species to facilitate reaction of the nitrogen species and hydrogen species at or near a reaction site in the layer.

When a catalyst or catalyst composition is provided as a coating on the membrane, the thickness of the coating will depend on the type of catalyst or catalyst composition and the process and reaction being undertaken. The thickness of the coating may be between any one of the following ranges (in µm): about 10 and 2000, about 15 and 1000, about 20 and 500, about 25 and 400, about 30 and 300, about 40 and 200, or about 50 and 150. The thickness of the coating may be at least about 10 µm, 30 µm, 50 µm, 70 µm, or 90 µm 150 µm, 200 µm, 300 µm, 500 µm, 750 µm, or 1000 µm. The thickness of the coating may be less than about 2000 µm, 1500 µm, 1000 µm, 800 µm, 600 µm, 400 µm, or 200 µm. The thickness of the catalyst layer may be selected to facilitate the proportion of hydrogen species transported through the membrane and the porosity and reaction of the second reactant species occurring in the layer (and membrane surface).

The amount of catalyst provided in the coating, or composition thereof, may be at least about 5, 10, 15, 20, 25, 30, 35, 40, 45, 50, 55, 60, 65, 70, 75, 80, 85, 90, 95 or 98 with respect to weight % of total composition. The amount of catalyst provided in the coating, or composition thereof, may be less than about 95, 90, 80, 70, 60, 50, 45, 40, 35, 30, 25, 20, 15, 10, or 5, with respect to weight % of total composition. The amount of catalyst provided in the coating, or composition thereof, may be in a range of about 5 to 98, with respect to weight % of total composition.

The amount of the hydrogen species permeable metal, alloy or metal oxide (e.g. PdO), provided in the coating, or composition thereof, may be at least about 1, 2, 3, 4, 5, 6, 7, 8, 9, 10, 15, 20, 25, 30, 40 or 50 with respect to weight % of total composition. The amount of hydrogen species permeable metal or alloy provided in the coating, or composition thereof, may be less than about 50, 40, 30, 20, 15, 10, 9, 8, 7, 6, 5, 4, 3, 2, or 1, with respect to weight % of total composition. The amount of hydrogen species permeable metal provided in the coating composition may be in a range of about 1 to 10, or 2 to 8, with respect to weight % of total composition.

Catalysts

It will be appreciated that the catalyst may be provided in a composition with one or more additives, such as binders, to facilitate coating of the catalyst to the surface modified membrane. The catalyst or coating thereof may be provided as a partial coating or a complete layer on the membrane. The catalysts or coating thereof may be provided on one or both sides or surfaces of the membrane, and may be individually selected. The catalyst may be selected to facilitate dissociation, migration or reaction of any species involved in the process. The catalyst may be deposited on the membrane by brush coating, painting, slurry spraying, spray pyrolysis, sputtering, chemical or physical vapour deposition techniques, electroplating, screen printing, or tape casting.

The product synthesis side of the membrane may be provided with a coating comprising a catalyst to facilitate the dissociation of a reactant, such as molecular nitrogen to atomic nitrogen, and to assist in the formation of a product, such as ammonia. A dissociation catalyst may be chosen from the group consisting of molybdenum, tungsten, iron, ruthenium, cobalt, boron, chromium, tantalum, nickel, and alloys, compounds and mixtures thereof.

The product synthesis side of the membrane may comprise a hydrogen insertion or hydrogenation catalyst. A hydrogen insertion or hydrogen catalyst can facilitate the insertion of hydrogen into intramolecular bonds of a reactant, e.g., a carbon-oxygen bond to form the oxygen containing organic materials described above, or a nitrogen triple bond to form ammonia or hydrazine or mixtures thereof. The hydrogen insertion or hydrogenation catalyst may be chosen from the group consisting of cobalt, ruthenium, osmium, nickel, palladium, platinum, and alloys, compounds and mixtures thereof. For example, in ammonia synthesis the catalyst may facilitate the dissociative adsorption of a hydrogen species source and a nitrogen species source for subsequent reaction.

The product synthesis side of the membrane may comprise a material that is catalytic for both dissociation of the reactant, for example, nitrogen, and catalytic for the insertion of hydrogen into the reactant intramolecular bond, e.g., nitrogen triple bond, carbon oxygen bond, or the oxygen-oxygen bond, among others.

When the process involves the migration of a hydrogen species through the membrane, the catalyst may be selected to facilitate a hydrogen insertion or hydrogenation reaction over a hydrogen ion formation reaction (i.e. an oxidation reaction of the surface hydride). Suitable catalyst compositions may comprise tungsten on palladium, iron on palladium, molybdenum on palladium, molybdenum on titanium, and iron on titanium.

Process Features

It will be appreciated that the above process may be used for synthesising a reaction product from a hydrogen insertion or hydrogenation reaction, wherein one example is synthesising ammonia from a hydrogen species source and a second reactant source that is a nitrogen species source.

In some embodiments, the processes described herein can provide a method of inserting hydrogen into a range of compounds, such as compounds containing carbon-oxygen, nitrogen-nitrogen, carbon-carbon including double and triple bonded carbon (e.g. alkenes and alkynes), carbon-nitrogen, and oxygen-oxygen multiple bonds.

In an embodiment, there is provided a hydrogen species selectively permeable solid membrane (HSPM) formed from a hydrogen permeable material selected from the group consisting of palladium, titanium and nickel, an alloy of palladium, titanium, vanadium, zirconium, niobium, tantalum or alloys of one or more from this group with silver, copper, chromium, iron, nickel or cobalt, and a cermet thereof, wherein at least one side of the membrane, or portion thereof, comprises a surface modification comprising a layer that is porous and contains within the layer a plurality of reactive sites comprising a metal species and a catalyst.

It will be appreciated that the catalyst is for promoting a reaction within the layer between two or more reactants. In an embodiment, the HSPM is for producing ammonia from a pressure driven system by reaction of a first reactant, provided by a hydrogen species source, with a second reactant, provided by a nitrogen species source, wherein the surface modification comprises a layer that is porous to the second reactant and contains a plurality of reactive sites comprising a metal species and a catalyst for promoting a reaction within the layer between the first and second reactants to form the product.

In another embodiment, there is provided a hydrogen species selectively permeable solid membrane (HSPM) formed from a hydrogen permeable material selected from the group consisting of palladium, titanium and nickel, an alloy of palladium, titanium, vanadium, zirconium, niobium, tantalum or alloys of one or more from this group with silver, copper, chromium, iron, nickel or cobalt, and a cermet thereof, wherein at least one side of the membrane, or portion thereof, comprises a surface modification provided by at least one of:

a. a roughened surface comprising a catalyst, the roughened surface being an outer layer of the HSPM and/or a layer deposited on the HSPM comprising a hydrogen species permeable metal, metal alloy, cermet or metal oxide thereof;

b. a catalyst composition intercalated, interspersed or embedded with the HSPM, wherein the catalyst composition comprises a catalyst and optionally a hydrogen species permeable metal, metal alloy, cermet or metal oxide thereof; and c. a coating comprising a catalyst and a hydrogen species permeable metal, metal alloy, cermet or metal oxide thereof.

In another embodiment, there is provided a hydrogen species selectively permeable solid membrane (HSPM) for producing ammonia from a pressure driven system by reaction of permeable hydrogen species source with a nitrogen species source, wherein the membrane is formed from a hydrogen permeable material selected from the group consisting of palladium, titanium and nickel, an alloy of palladium, titanium, vanadium, zirconium, niobium, tantalum or alloys of one or more from this group with silver, copper, chromium, iron, nickel or cobalt, and a cermet thereof, and the membrane further comprises a surface modification comprising a layer that is porous to the nitrogen species source and contains within the layer a plurality of reactive sites comprising a metal species and a catalyst for promoting a reaction within the layer between the hydrogen species and the nitrogen species for forming ammonia.

As described previously, it will be appreciated that the reactive sites are provided throughout the surface modified layer, for example the reactive sites are located internally within the layer.

In an embodiment, there is provided a hydrogen species selectively permeable solid membrane (HSPM) for producing ammonia from a pressure driven system. The membrane may comprise a hydrogen permeable material selected from the group consisting of palladium, titanium and nickel, an alloy of palladium, titanium and nickel, and a cermet thereof. The HSPM may comprise a surface modification according to any of the above embodiments previously described for the processes or membrane.

As previously described for the above processes, it will be appreciated that the "pressure driven system" simply provides a differential partial pressure that drives the reaction, and it is not necessary to provide a pressure system with a constant high pressure, although variations regarding pressures may form embodiments of the above aspects to provide further advantages.

For processes of ammonia synthesis, the product synthesis side of the membrane may comprise an ammonia synthesis catalyst. The ammonia synthesis catalyst may be selected from an iron oxide based catalyst. In an embodiment, the ammonia synthesis catalyst comprises the mineral iron oxide Wüstite or hematite. To facilitate high ammonia synthesis rates and hydrogen to ammonia conversion rates, the outer layer of the surface modified HPSM may be provided with a high number of triple phase boundaries between the hydrogen permeable phase and synthesis catalyst (to facilitate reaction of hydrogen species emanating from the hydrogen permeable phase with nitrogen species emanating through the porous catalyst). The catalyst when provided as a coating should be suitably adhered to the membrane. It will be appreciated that other non-conventional ammonia synthesis catalysts such as Ru-Promoter (Ba, K, Cs) on oxides such as MgO, $CeO_2$, nitride catalysts such as CoMoN based catalysts, Metal on nitrides such as Ru/BN catalysts and metals on carbon based supports such as Ru-promoter/graphite supports to name a few, may be suitable.

When the reaction process is directed to produce ammonia and the second reactant source comprises a source of nitrogen, such as molecular nitrogen, molecular nitrogen can adsorb on the product synthesis side of the membrane and dissociate to provide a nitrogen species for reaction with the migrated mobile hydrogen species to produce ammonia.

As described above, the application of a partial pressure differential of hydrogen across the membrane can drive the migration of the hydrogen species through the membrane from the hydrogen species receiving side to the product synthesis side. The surface hydrogen concentration on the hydrogen species receiving side of the HSPM is one factor associated with the flux of hydrogen species transmitted or migrated through the membrane. The flux of hydrogen species through the membrane can be controlled by selecting higher concentrations of hydrogen species provided on the hydrogen species receiving side of the membrane relative to the product synthesis side of the membrane to impart a concentration gradient and drive migration of the hydrogen species through the membrane (e.g. partial pressure differential when source is a gas). For example, a gaseous source of hydrogen species may be provided at varying concentrations and pressures to the hydrogen species receiving side of the membrane, while providing a second reactant source that does not provide a source of hydrogen species. The flux of hydrogen species migrating through the membrane can also be controlled by other factors including the selection of the particular type of membranes, temperatures and pressures.

The hydrogen species source provides a source of mobile hydrogen species capable of migration through the solid membrane for reaction with the second reactant. The first hydrogen species source may provide a source of a first reactant in the form or species that can migrate through the membrane, or at least a source capable of conversion in situ into a form or species that can migrate through the membrane. For example, a hydrogen species source may comprise or consist of molecular hydrogen. Molecular hydrogen may in situ undergo dissociation at or near the surface of the membrane to provide mobile hydrogen species capable of migration through the membrane. It will be appreciated that the mobile hydrogen species may be a positively and/or negatively charged species, such as a hydride or proton, which may depend on the selected membrane and type of process being undertaken. This transmission process may be facilitated by the use of one or more catalysts on i) the hydrogen species receiving side of the membrane, ii) the product synthesis side of the membrane, or iii) on both sides of the membrane.

It will be appreciated that the second reactant source provides a source of the second reactant for reaction on the product synthesis side of the membrane with the mobile hydrogen species that has migrated through the membrane. The second reactant source may provide a second reactant for reaction with the hydrogen species, or at least provide a source capable of conversion into a form or species that can react with the hydrogen species. For example, the second reactant source may comprise or consist of molecular nitrogen. Molecular nitrogen may be converted in situ into a nitrogen species capable of reaction with the hydrogen species. For example, molecular nitrogen may be converted at or near the product synthesis side of the membrane to a reactive species, which may adsorb to the membrane for reaction with the hydrogen species. The reaction on the product synthesis side of the membrane may also be facilitated by the use of one or more catalysts.

It will be appreciated that a range of products may be obtained from the process, for example products obtained from a hydrogen insertion or hydrogenation reaction. The process may cover production of a range of inorganic and organic compounds, and for example may involve the following types of reactions and products:

Hydrogenation or hydrogen insertion with a nitrogen species or compound comprising nitrogen, for example reaction of a hydrogen species and a nitrogen species to form ammonia;

$CO_2$ hydrogenation to produce products such as methanol, formic acid, dimethylcarbonate and carbon monoxide;

Alkene hydrogenation, for example hexene to hexane or benzene to cyclohexane;

Alkyne hydrogenation, for example alkyne to alkene and/or alkane, or nitriles to amines.

It will be appreciated that various parameters and conditions used in the process, such as temperatures, pressures and concentration/amounts of materials and reactants, may be selected depending on a range of variables of the process including the product to be synthesised, chemical reaction or mechanisms involved, second reactant source, selection of catalyst(s) used within or coated on the membrane if present, or type of membrane or reactor being used and materials and configuration thereof.

Temperatures (° C.) in relation to the process may be in a range between 0 and 1000, or at any integer or range of any integers therebetween. For example, the temperature (° C.) may be at least about 50, 100, 150, 200, 250, 300, 350, 400, 450, 500, 550, 600, 650, 700, or 750. For example, the temperature (° C.) may be less than about 800, 750, 700, 650, 600, 550, 500, 450, 400, 350, 300, 250, 200, 150, 100, or 50. The temperature may also be provided at about any of these values or in a range between any of these values, such as a range between about 100 to 800° C., about 150 to 700°

C., about 200 to 600° C., or 300 to 500° C., or at a range between about 400 to 600° C. or 450 to 550° C., or at about 500° C.

It will be appreciated that reactant sources, namely the hydrogen species source and second reactant source, are typically provided as fluids to facilitate processing operations. Reactant sources that are fluidic may be independently provided in the form of solids, liquids, gases, or mixtures thereof. Depending on the selected operating parameters of the process, the reactant sources may vary in form at different stages in the process. For example, the hydrogen species source or second reactant source may be provided to a reaction chamber from an inlet as a liquid or solid feed (such as any type of carbon or hydrocarbon based fuel, or water as a source of hydrogen species), although in a reaction chamber at operating conditions may react in a different form.

It will be appreciated that the absolute pressures applied during the operation of the process is selected depending on the reaction being undertaken. What is important is that the conditions enable the hydrogen species to migrate through the membrane from the hydrogen species receiving side to the product synthesis side. A partial pressure differential of the hydrogen species source can be provided across the membrane such that the concentration of hydrogen is lower on the product synthesis side than on the hydrogen species receiving side, to thereby effect migration of the hydrogen species through the membrane to the product synthesis side for reaction with the second reactant to form the product. A large pressure differential is not required, provided a positive partial pressure differential of the migrating hydrogen species (through the membrane) is maintained between the sides of the membrane as described above.

Provided a partial pressure differential of hydrogen is maintained across the membrane as described above, the absolute pressures may be in a range of about 1 to 100 bar, or at any integer or range of any integers there between, such as about 1 to 50 bar, about 1 to 20 bar, or about 6 bar. The absolute pressure on the hydrogen species receiving side of the membrane may be the same or different to the absolute pressure on the product synthesis side of the membrane, provided a partial pressure differential of hydrogen is maintained across the membrane as described above. In some embodiments higher pressures may provide further advantages, for example by increasing the concentrations of reacting species or by driving the reaction forward to increase product yield.

The pressure (in bar) on the hydrogen species receiving side of the membrane may be in a range of about 1 to 100, including at any integer or range of any integers therebetween, for example at least about 1, 2, 3, 4, 5, 6, 7, 8, 9, 10, 20, 50, or 100, or less than about 50, 20, 10, 9, 8, 7, 6, 5, 4, 3, 2, or 1. The pressure on the product synthesis side of the membrane may be in the range of about 1 to 100 bar, including at any integer or range of any integers therebetween, for example at least about 1, 2, 3, 4, 5, 6, 7, 8, 9, 10, 20, 50, or 100, or less than about 50, 20, 10, 9, 8, 7, 6, 5, 4, 3, 2, or 1. In one embodiment, the pressure on the product synthesis side of the membrane may be at any pressure less than about 20 bar, for example less than about 10 bar, 9 bar, 8 bar, 7 bar, 6 bar, 5 bar, 4 bar, 3 bar, or 2 bar In another embodiment, the partial pressure differential between the hydrogen species receiving side of the membrane and the product synthesis side of the membrane may be in a range of 1:100 bar to 100:1 bar, respectively, for example about 2:1 bar, 3:2 bar, 4:3 bar, 5:4 bar, 6:5 bar, or 7:6 bar, or 10:1 bar, 20:1 bar, 50:1 bar respectively.

It will be appreciated that the process may comprise the use of one or more membranes, which may for example be stacked into modules. The one or more membranes may be individually formed from one or more materials selected from metals, alloys and cermets. The one or more membranes may be independently surface modified.

In another embodiment, hydrogen may be provided in substantially pure form generated by electrolysing water. Hydrogen may be supplied by coal gasification or natural gas (NG) reforming, followed by water-gas-shift (WGS) reaction ($CO+H2O=CO2+H2$), hydrogen separation from a mixture of hydrogen and $CO_2$, and optional hydrogen gas cleaning to remove any impurities. Hydrogen separation from a mixture of hydrogen and $CO_2$, when carbon containing sources are used for hydrogen production, may be optional following water gas shift reaction, and hydrogen and $CO_2$ can be fed directly to the hydrogen species receiving side of the membrane.

In a further embodiment, a WGS catalyst can be incorporated in the hydrogen species receiving side of the membrane to perform WGS reaction in-situ. As hydrogen is removed by the membrane towards the product synthesis side of the reactor, the WGS reaction will be more favoured.

The above options for hydrogen source will reduce the overall costs of hydrogen feedstock in the process.

Ammonia Synthesis

The process includes the synthesis of ammonia. It will be appreciated that the above embodiments may apply to the synthesis of ammonia. Further embodiments and aspects more directed to ammonia synthesis are described in further detail as follows.

In an embodiment, there is provided a process for synthesis of ammonia by reaction of at least a hydrogen species with a nitrogen species, the process comprising the steps of:
  (v) providing a hydrogen species selectively permeable solid membrane (HSPM) having a hydrogen species receiving side and a product synthesis side;
  (vi) providing a hydrogen species source at the hydrogen species receiving side;
  (vii) providing a nitrogen species source at the product synthesis side;
  (viii) providing a concentration gradient or a partial pressure differential of the hydrogen species source across the HSPM such that the concentration of hydrogen is lower on the product synthesis side than on the hydrogen species receiving side to thereby effect migration of the hydrogen species through the HSPM for reaction with the nitrogen species at or near the surface of the product synthesis side to form ammonia;
  wherein at least the product synthesis side of the HSPM has a surface modification according to any of the embodiments described herein.

In one embodiment, the temperatures (° C.) in relation to the process may be provided in a range between about 100 to 800° C. about 150 to 700° C., about 200 to 600° C., or 300 to 500° C., or at a range between about 400 to 600° C. or 450 to 550° C., or at about 500° C.

In another embodiment, the pressure on the product synthesis side of the membrane may be at any pressure less than about 20 bar, for example less than about 10 bar, 9 bar, 8 bar, 7 bar, 6 bar, 5 bar, 4 bar, 3 bar, or 2 bar In another embodiment, the partial pressure differential between the hydrogen species receiving side of the membrane and the product synthesis side of the membrane may be in a range of 1:50 bar to 50:1 bar, respectively, for example about 2:1 bar, 3:2 bar, 4:3 bar, 5:4 bar, 6:5 bar, or 7:6 bar, or 10:1 bar, 20:1 bar, 50:1 bar respectively.

As described in the above embodiments for ammonia synthesis, the membrane is a surface modified hydrogen permeable palladium membrane. The surface modified hydrogen permeable palladium membrane may comprise or consist of a substrate (core layer) comprising a surface modification selected from at least one of a metal sputtered surface and a deposited metal layer, wherein the surface modified membrane comprises an outer coating comprising a catalyst.

As described in the above embodiments for ammonia synthesis, the product synthesis side of the membrane comprises an ammonia synthesis catalyst. The ammonia synthesis catalyst may be selected from an iron oxide based catalyst. In one embodiment, the ammonia synthesis catalyst comprises the mineral iron oxide Wüstite or hematite. For ammonia synthesis, the catalyst is porous to facilitate reaction of the nitrogen species and hydrogen species at the membrane/catalyst interface. To facilitate high ammonia synthesis rates and hydrogen to ammonia conversion rates, the outer layer of the HPSM may be provided with a high number of triple phase boundaries between the hydrogen permeable phase and the ammonia synthesis catalyst (to facilitate reaction of hydrogen species emanating from the membrane with nitrogen species emanating through the porous catalyst). It is important that the catalyst when provided as a coating is suitably adhered to the membrane. It will be appreciated that other non-conventional ammonia synthesis catalysts may be suitable.

It will also be appreciated that various embodiments described herein may also apply as particular embodiments in relation to ammonia synthesis.

Chemical Reactors

A system for synthesising a product using a hydrogen permeable solid membrane selectively permeable to a hydrogen species for reaction with a second reactant may comprise a reactor of varying configurations. The reactor comprises at least a first and a second chamber section separated by a selectively hydrogen permeable solid membrane (HSPM) configured to provide a hydrogen species receiving side of the membrane in the first chamber section and a product synthesis side of the membrane in the second chamber section. The reactor also includes at least a hydrogen species source inlet for supply of a hydrogen species source to the first chamber section, and at least a second reactant inlet for supply of a second reactant source to the second chamber section. It will be appreciated that the reactor or system also includes at least a first outlet for obtaining at least a product of the reaction. The system also comprises a control means, such as a pressure control means, to drive migration of the hydrogen species through the membrane by imparting a concentration gradient or partial pressure differential of the hydrogen species.

The reactor may comprise a single membrane or a plurality of membranes, which for example may be stacked in the form of modules. The system may comprise a plurality of reactors. The reactors may operate in series or in parallel. The membranes may be a flat plate structure or a tubular structure. A number of membranes may be stacked together in a planar or tubular configuration. A number of single reactors may be combined to form a multi-tube module.

It will be appreciated that the system, reactor, or each chamber section, may include one or more inlets and outlets to provide supply of reactants, obtain products, or to recirculate various reactants and/or products.

It will also be appreciated that the reactor or system may be designed for recycling of the various reactants, reactant sources, intermediary products, or desired products provided to and produced in the chamber sections. The reactor or system may be provided in various designs and forms, for example in the form of a tubular reactor.

In the reactor, the second chamber section, second chamber inlet or product synthesis side of the membrane, may each be independently designed or configured together for directing the flow of the second reactant source across the surface of the membrane to facilitate the reaction. For example, channels may be provided at the surface of the membrane. The channels may be designed to facilitate forcing the nitrogen gas to sweep at close proximity to active sites on the membrane. It will be appreciated that the active sites are present at or near the surface of the hydrogen permeable phase, or when a catalyst is provided as a coating on the membrane then at or near the interface between the membrane and the catalyst. Such configurations and design provide further advantages for ammonia synthesis and can increase hydrogen conversion rates at less severe process conditions. The channels may be of various configurations and dimensions, such as parallel channels and serpentine channels.

The system and processes may also be integrated into more complex systems, such as systems and processes comprising a coal gasifier, electrolyser and/or natural gas reformer. The system and processes may also be used for hydrogen separation from other impurities, which may be provided in a reformate for storage as a product such as ammonia.

It will be understood to persons skilled in the art of the invention that many modifications may be made without departing from the scope of the invention.

It is to be understood that, if any prior art publication is referred to herein, such reference does not constitute an admission that the publication forms a part of the common general knowledge in the art, in Australia or any other country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

EXAMPLES

In order that the invention may be more clearly understood, particular embodiments of the invention are described in further detail below by reference to the following non-limiting experimental materials, methodologies and examples.

Figure 2:
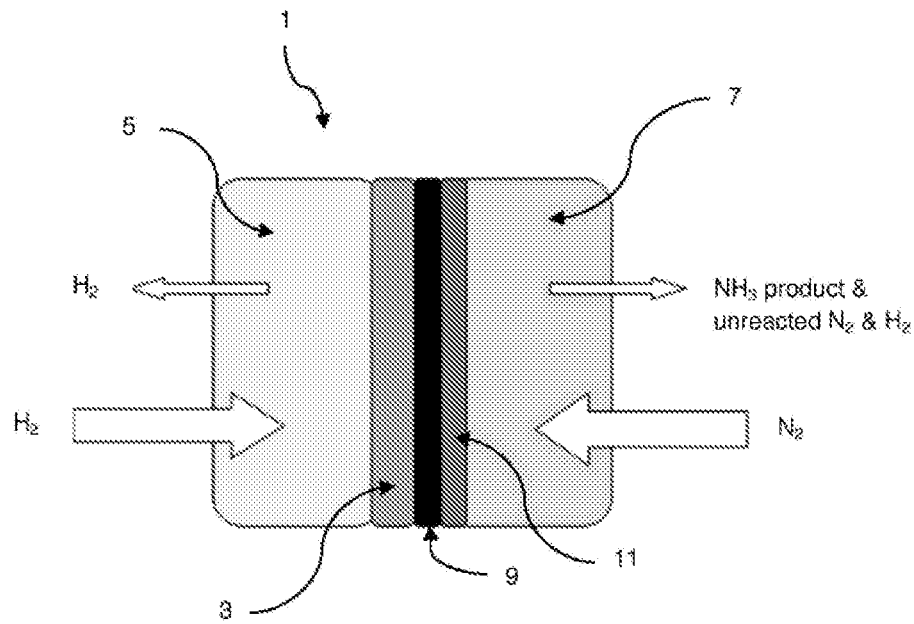
FIG. 2 provides a schematic representation of a hydrogen pressure driven membrane system for producing ammonia according to one embodiment of the invention.

For the below examples an HSPM membrane of palladium of specified thickness was assembled in a reactor chamber that allowed operation of the reactor at temperatures of up to 600° C. and pressure differentials across the membrane of up to 10 bar. FIG. 2 shows a schematic of the membrane reactor that can be employed for ammonia synthesis. With reference to FIG. 2, the reactor chamber (1) was separated by the membrane (3) into a hydrogen species receiving side, namely the first chamber section (5), and a product synthesis side, namely the second chamber section (7). The hydrogen species receiving side of the membrane was established by providing, to the first chamber section (5), a first reactant hydrogen species source in the form of hydrogen gas at a positive partial pressure differential with respect to the second chamber section (7) (product synthesis side), which itself was provided with a second reactant source of nitrogen gas. The membrane (3) in FIG. 2 is provided with a Pd sputtered surface (9) that is coated with a catalyst composition (11). In the below examples a nominally 100 μm thick palladium membrane (3) was used with an active area of about 3.2 cm$^2$ for the hydrogen permeation and the synthesis reaction. The palladium membrane was surface modified with palladium sputtering (9), which was about 100 nm in thickness, and a coating comprising a catalyst (11) applied to the membrane. Unless specified otherwise, in the following examples a "thin coating" is about 0.1 mm and a "thick coating" is about 0.3 mm.

The ammonia production rates in the below examples were measured by purging the exit gas from the second chamber section (7) of the reactor through a known volume of water or dilute sulphuric acid solution (0.05M) and calculating the ppm level of ammonia dissolved over a fixed period of time (1 to 24 hours) by employing ion-selective ammonia measuring probe or by volumetric titration of the solution against a standardised base (KOH) solution.

Figure 3:
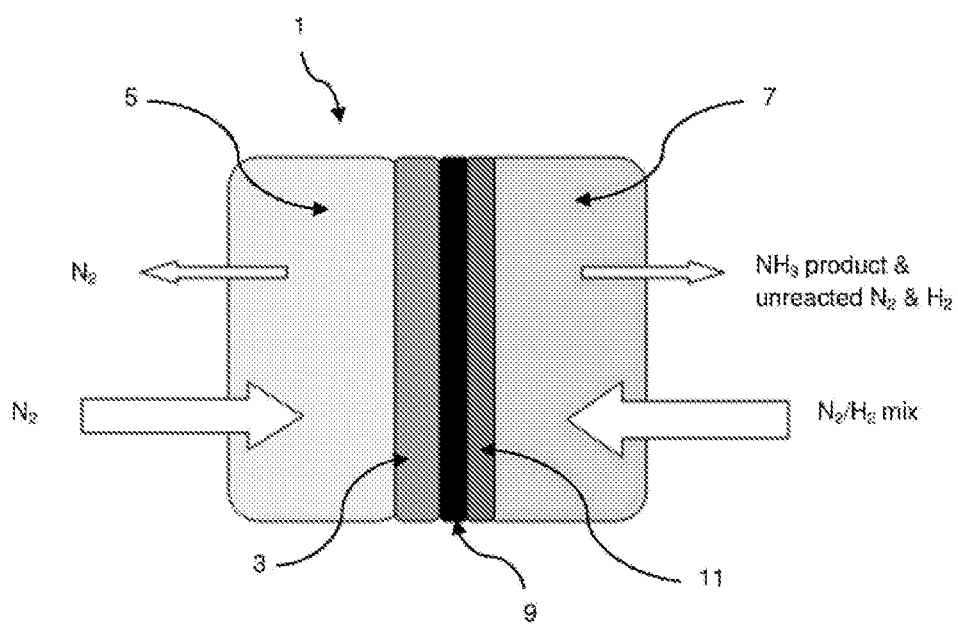
FIG. 3 (control) provides a schematic representation for a control membrane system where there is no pressure application such that mobile hydrogen species do not migrate through the membrane.

In order to investigate and verify the effectiveness of the membrane (permeated hydrogen) process on the ammonia synthesis rates, nitrogen (instead of hydrogen) was supplied to the first chamber section of the reactor (thus no hydrogen flow through the membrane) and a stoichiometric composition of gas mixture for ammonia synthesis ($H_2:N_2$ being at a ratio of 3:1) was supplied to the second chamber section of the reactor as shown schematically in FIG. 3. The numbered features shown in FIG. 3 generally correspond to the features described above for FIG. 2.

Example 1: 'Permeating Hydrogen' vs 'Non-Permeating Hydrogen' Synthesis

Ammonia synthesis according to an embodiment of the invention was performed by permeating hydrogen through the membrane to react with nitrogen (FIG. 2). To identify the effectiveness of the process a comparative example was established for a non-hydrogen permeating membrane (FIG. 3) by providing an $N_2$ gas source to the first chamber section side of the membrane (hydrogen species receiving side) and an $H_2/N_2$ gas mixture to the second chamber section side of the membrane (product synthesis side). The membrane surface was either Pd sputtered (100 nm thick layer) or Pd sputtered and coated with a thin (0.1 mm) or a thick (0.3 mm) layer of catalyst. The Pd sputtering was carried out by physical vapour deposition. The catalyst used was a commercial heterogeneous iron oxide based ammonia synthesis catalyst ground to a fine powder (<100 mesh) and prepared into an ink (with an organic solvent). The catalyst ink was deposited on the Pd sputtered surface on the product synthesis side of the membrane. The catalyst layer was dried in the oven and the deposited layer was varied in thickness from 0.1-0.3 mm. The synthesis rates observed with permeating hydrogen and those obtained with the comparative $H_2/H_2$ gas mixture are compared in FIG. 4 with first chamber section/second chamber section pressure settings of 5 bar/4 bar respectively. The ammonia synthesis rates observed to be 2-4 times greater for permeating hydrogen compared to non-permeating hydrogen synthesis. For example, where a Pd sputtered and thick catalyst coated membrane was used, with operating conditions at 400° C., the synthesis rates for permeating hydrogen were about 4.5 times compared to non-permeating hydrogen synthesis.

Example 2: Membrane Surface Modification

Figure 5:
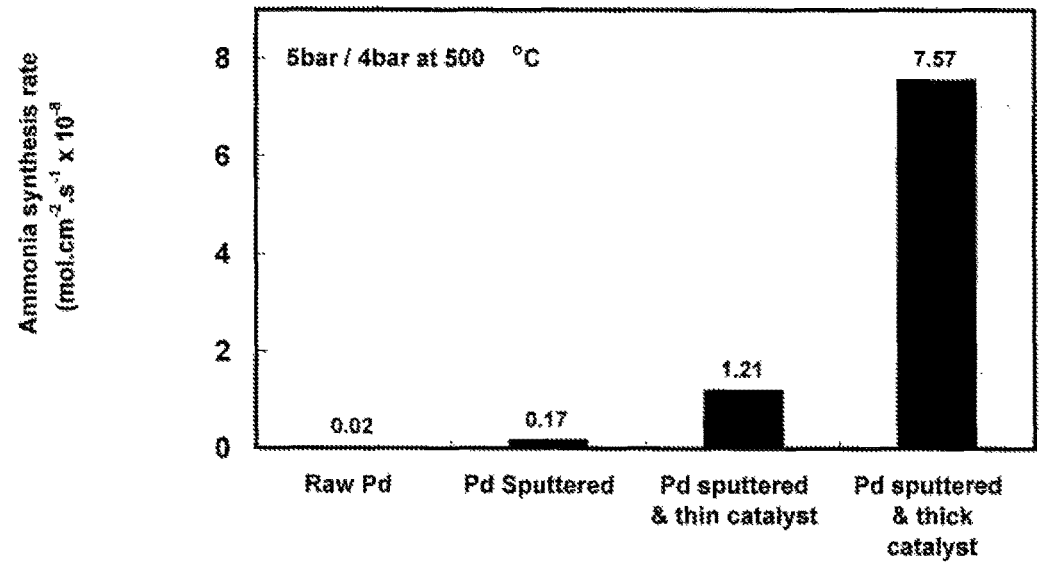
FIG. 5 provides a graph showing a comparison of ammonia synthesis rates for unmodified, surface modified and catalyst coated membranes according to an embodiment of the invention.

The surface treatment of the product synthesis side of the membrane was found to play a significant role in the enhancement of ammonia synthesis rates. In order to verify this, the ammonia synthesis rates produced with a raw surface of the membrane (palladium metal only with no further surface treatment or catalyst coating) were compared with those obtained with a Pd sputtered surface of the membrane. The Pd sputtered membrane is made by sputtering Pd on the raw surface of a 100 micron thick Pd sheet. A 100 nm layer of Pd was sputtered on the product synthesis side of the membrane by physical vapour deposition. The observed ammonia synthesis rates were found to be about 8 times higher with the Pd sputtered surface compared to the raw surface, when operating conditions at the hydrogen species receiving side (first chamber section)/product synthesis side (second chamber section) had pressure settings of 5 bar/4 bar respectively at 500° C., as shown in FIG. 5.

Example 3: Membrane Surface Modification Comprising Catalyst

Figure 4:
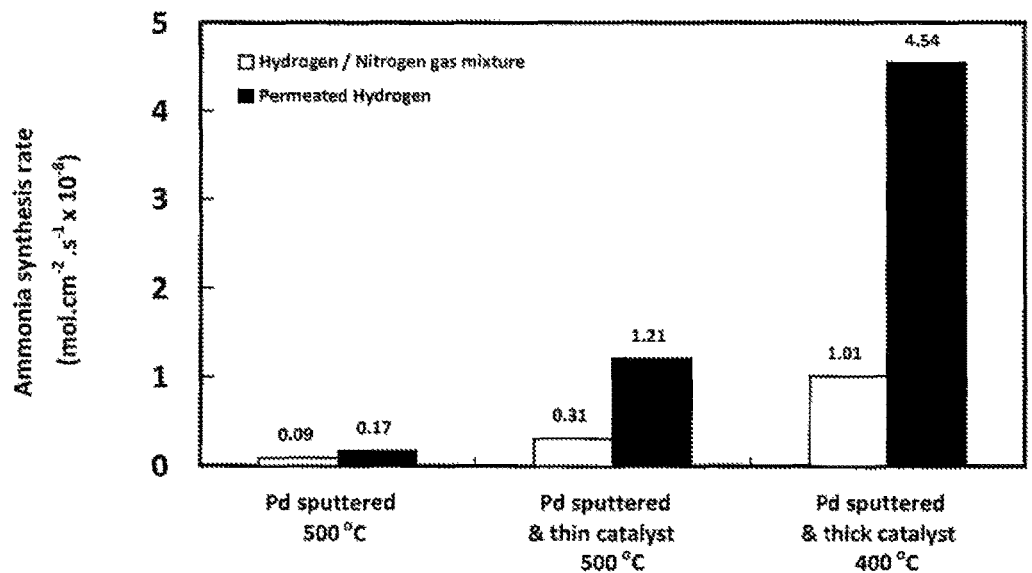
FIG. 4 provides a graph showing a comparison in ammonia synthesis rates between the hydrogen permeating system according to FIG. 1 and the non-hydrogen permeating system according to FIG. 2.

A Pd membrane (without sputtering or catalyst coating) was found to provide a catalytic surface for the ammonia synthesis, although the synthesis rates were relatively low in the experimental conditions employed. The synthesis rates were identified to be significantly higher for the Pd sputtered membrane surface compared to Pd raw surface, and surprisingly increased significantly with a commercial catalyst deposited on top of sputtered Pd membrane. For this, a commercial heterogeneous iron oxide based ammonia synthesis catalyst was deposited on the Pd sputtered surface on the product synthesis side (second chamber section) of the membrane to achieve a thickness of about 0.1 mm. The synthesis rates were compared at the hydrogen species receiving side (first chamber section)/product synthesis side (second chamber section) pressure settings of 5 bar/4 bar respectively at 500° C. and are shown in FIG. 5. The observed ammonia synthesis rates were found to be seven times higher with the catalyst layer compared to those without the catalyst layer. In the case of chemical synthesis in the comparative example, which was performed by flowing $H_2/N_2$ gas mixture over catalyst layer in the product synthesis side under similar conditions (no hydrogen flowing through the membrane), the synthesis rates were 3½ times with catalyst coating compared to without the catalyst coating (FIG. 4).

Example 4: Catalyst Loading and Type

In another experiment, the Pd sputtered membrane was coated with a thick layer of catalyst to investigate the effect of catalyst loadings. The prepared thickness of the catalyst layer was about 0.3 mm with a net catalyst loading of around 70 mg/cm$^2$. The ammonia synthesis rates were measured to be more than six times compared to those measured with thin catalyst loadings (about 0.1 mm thick) at hydrogen species receiving side (first chamber section)/product synthesis side (second chamber section) pressure settings of 5 bar/4 bar respectively at 500° C. and results are shown in FIG. 5.

In order to investigate the effect of the type of catalyst, an in-house synthesised catalyst (non-commercial) was coated on the Pd sputtered membrane. The catalyst layer thickness was about 0.1 mm with a loading of around 5 mg/cm$^2$. The ammonia synthesis rates were compared with those achieved with a thin layer of commercial heterogeneous ammonia synthesis catalyst as described in the above examples. It was observed that the in-house catalyst achieved 3 times the ammonia synthesis rates compared to 7 times as achieved by the commercial catalyst, when compared to those obtained by only Pd sputtering of the membrane under similar operating conditions (hydrogen species receiving side/product synthesis side pressure settings of 5 bar/4 bar respectively at 500° C.).

Example 5: Temperature and Pressure Effects

Figure 6:
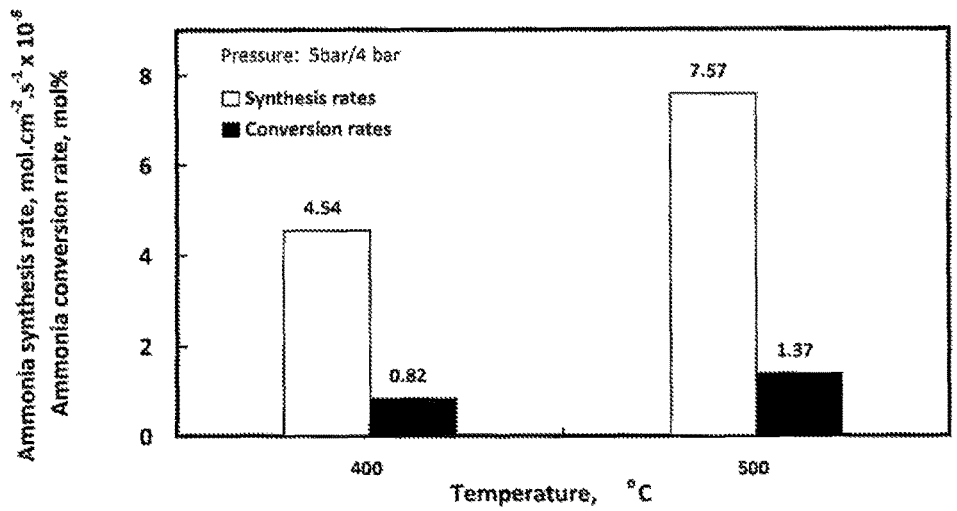
FIG. 6 provides a graph showing the temperature effect on synthesis and conversion rates in a system for producing ammonia according than embodiment of the invention.

The ammonia synthesis experiments were performed with a thick commercial ammonia synthesis catalyst layer deposited on the Pd sputtered surface of the Pd membrane at 400 and 500° C. under similar gas flow and pressure conditions (hydrogen species receiving side/product synthesis side pressure settings of 5 bar/4 bar respectively). The ammonia synthesis rates obtained at 500° C. were about 1.7 times higher than those obtained at 400° C. as shown in FIG. 6.

Figure 7:
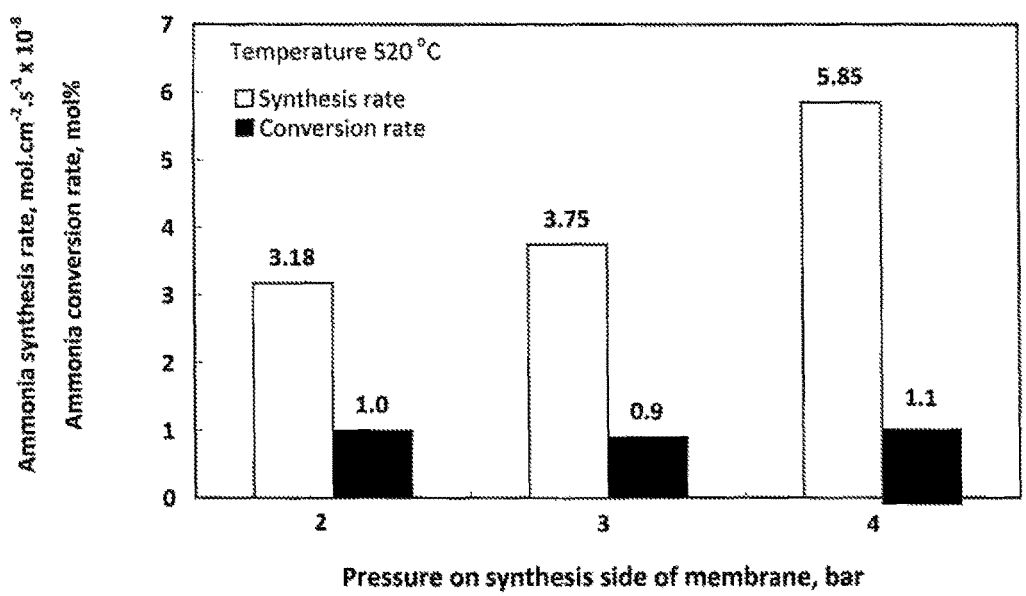
FIG. 7 provides a graph showing the pressure effect on synthesis and conversion rates in a system for producing ammonia according to an embodiment of the invention.

In another set of experiments, the effect of varying pressure of hydrogen on the ammonia synthesis rates and ammonia conversion rates was studied. A palladium membrane with sputtered surface and an outer layer/coating comprising commercial ammonia synthesis catalyst was used in these experiments. The rates were measured at the hydrogen species receiving side/product synthesis side pressure settings respectively of 5 bar/4 bar, 4 bar/3 bar and 3 bar/2 bar, with all other conditions such as temperature and gas flow rates into the respective chambers remaining the same. FIG. 7 shows the effect of these pressure settings on the ammonia synthesis rates at 520° C. The synthesis rates are shown to be higher at higher chamber pressures, although it appears the pressure increase has a negligible effect on conversion rates.

Example 6: Nitrogen Gas Purge Effects

Figure 8:
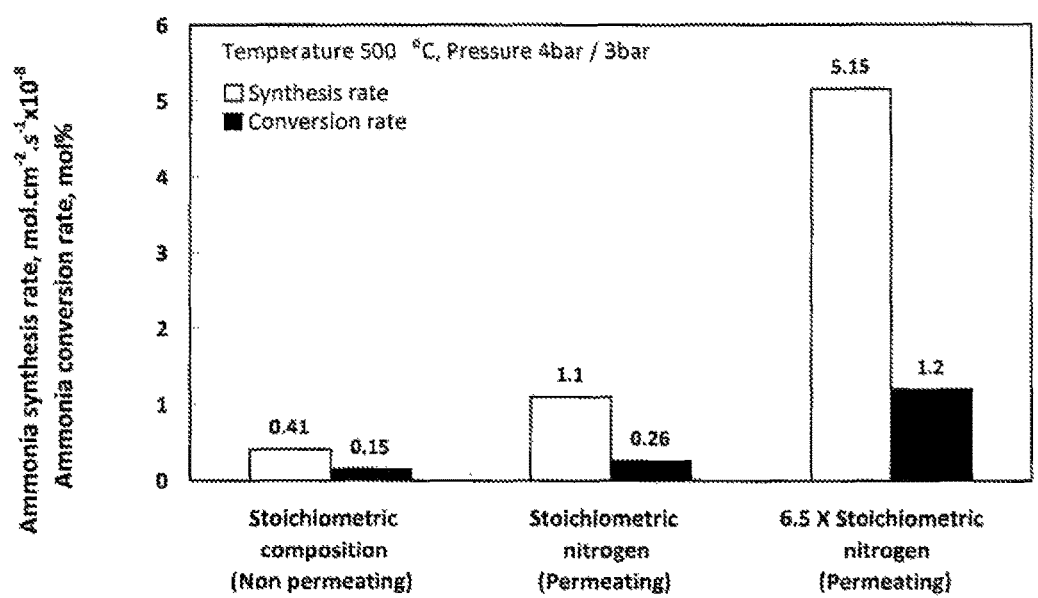
FIG. 8 provides a graph showing the effect of increasing the stoichiometric ratio of nitrogen:hydrogen on synthesis and conversion rates in a system for producing ammonia operating at a pressure differential of 4:3 bar across the membrane according to an embodiment of the invention.
Figure 9:
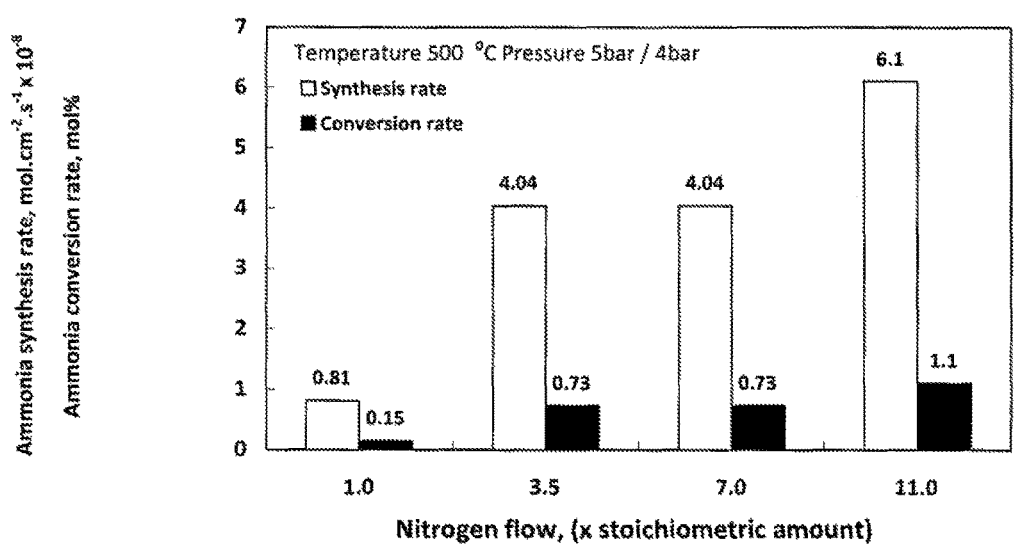
FIG. 9 provides a graph showing the effect of increasing the stoichiometric ratio of nitrogen:hydrogen on synthesis and conversion rates in a system for producing ammonia operating at a pressure differential of 5:4 bar across the membrane according to an embodiment of the invention.

In another set of experiments the effect of nitrogen purge rate on the ammonia product synthesis side of the membrane was studied. A palladium membrane with sputtered surface and an outer layer/coating comprising commercial ammonia synthesis catalyst was used in these experiments. All other experimental conditions remained the same (temperature 500° C.; pressures hydrogen species receiving side (first chamber section)/product synthesis side (second chamber section) respectively at 5 bar/4 bar and 4 bar/3 bar; hydrogen flow into inlet chamber: 0.5 L/min). FIGS. 8 and 9 show the effect of the nitrogen purge rates on the ammonia synthesis rates at 500° C. for pressure settings of respectively 5 bar/4 bar and 4 bar/3 bar. Nitrogen purge rates on the X-axis are represented in terms of the stoichiometric amount of nitrogen required for synthesising ammonia from the hydrogen permeating through the membrane. The synthesis rates are shown to be higher for permeating hydrogen, and increase with increase in the nitrogen flow rates. The hydrogen conversion rates as well as ammonia synthesis rates are also shown to improve with the increase in nitrogen flow.

Example 7: Pressure Differential Variation

Figure 10:
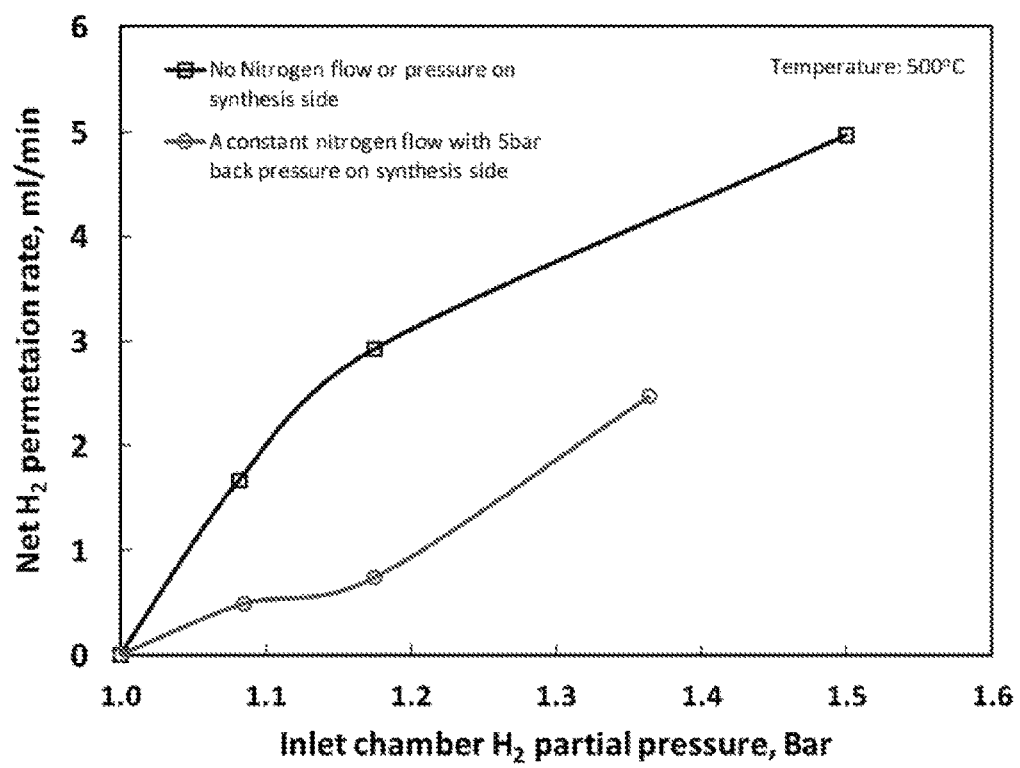
FIG. 10 provides a graph showing the net hydrogen permeation rate as a function of pressure in the hydrogen species receiving side of the chamber, when there is no nitrogen flow (or pressure) in the product synthesis side of the chamber and also when there is a constant flow of nitrogen into product synthesis side of the chamber with 5 bar of back pressure.

In another variation, the pressure on the product synthesis side of the membrane can be kept higher than that on the hydrogen species receiving side of the membrane. This can allow more control over the hydrogen permeation rates through the membrane. In addition this can enhance the product synthesis rates (high pressure favours the synthesis reaction) as well as hydrogen to ammonia conversion rates (due to low hydrogen permeation). FIG. 10 shows the net hydrogen permeation rate as a function of pressure in the hydrogen receiving side of the chamber, when there is no nitrogen flow (or pressure) in the product synthesis side of the chamber and also when there is a constant flow of nitrogen into product synthesis side of the chamber with 5 bar of back pressure. This shows that the hydrogen permeation rates have dropped due to the back pressure in the product synthesis side of the chamber, although these results also show that as long as there is a hydrogen partial pressure difference across the membrane, irrespective of the physical pressure conditions in the two chambers, hydrogen will continue to permeate through the membrane for the ammonia synthesis reaction.

Example 8: Extended Zone of Active Sites

In another variation of the experimental set up, two further experiments were performed to further study the effect of enhancing triple phase reaction sites on ammonia production rates.

In a first experiment, the Pd sputtered 100 micron thick Pd membrane was roughened by emery paper and the commercial heterogeneous iron oxide based ammonia synthesis catalyst layer was coated thereon (0.2 g on 3.4 $cm^2$ membrane area). In a second experiment, a small quantity of Pd, in the form of Palladium oxide (5 wt %), was added to a commercial heterogeneous iron oxide based ammonia synthesis catalyst, and deposited on the membrane as a thin layer producing only $\frac{1}{5}^{th}$ the quantity of Pd used in the first experiment (0.04 g on 3.4 $cm^2$ membrane area as compared to 0.2 g in the first experiment). It is worth noting here that PdO is reduced to Pd under the conditions during testing. The purpose of this second experiment was to increase the number of triple phase reaction sites: by enhancing the interfacial surface area between the catalytic component and the hydrogen species permeable material (Pd) to thereby maximise reaction sites for synthesis of the product. It will be appreciated that this surface modification, including embodiments shown in FIGS. 1(c), 1(d) and 1(e), can be determined by a range of instruments and methods including spectroscopy and microscopy methods, for example scanning electron microscopy.

Figure 11:
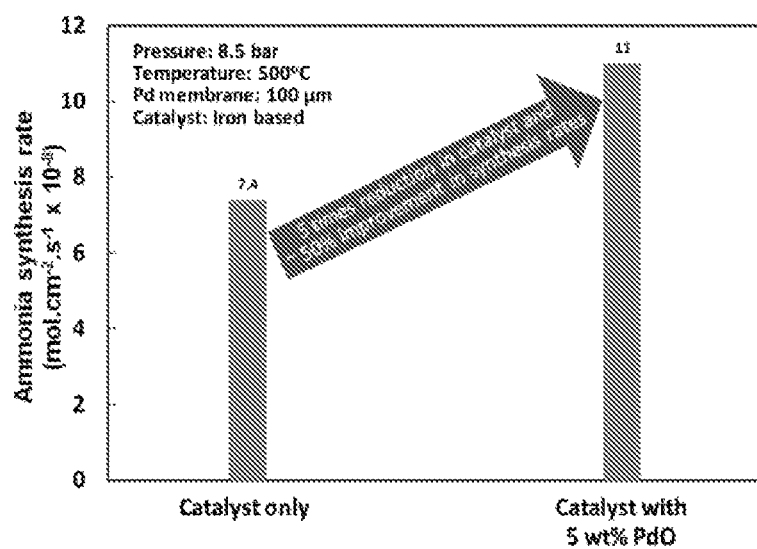
FIG. 11 compares the reaction rates for membranes in the absence and presence of surface modification.

The ammonia synthesis rates at 500° C. at 8.5 bar pressure on the ammonia synthesis side and 9.5 bar on the hydrogen supply side were determined and results are compared in FIG. 11. It was found that by adding merely 5 wt % PdO to commercial heterogeneous iron oxide based ammonia synthesis catalyst and despite reducing the total catalyst quantity to $\frac{1}{5}^{th}$, the ammonia production rate increased by around 50% when compared to the experimental set up where no PdO was added. Incorporation of Pd on the surface of Pd membrane extends the triple phase boundary area and increases reaction sites between HSPM, catalyst and nitrogen. The use of PdO enabled significantly less Pd to be required for catalytic activity, thereby reducing overall cost of the surface modified membrane.

The invention claimed is:

1. A process for synthesis of a product by reaction of at least a first reactant comprising a hydrogen species with a second reactant, the process comprising:
    (i) providing a hydrogen species selectively permeable solid membrane (HSPM) having a hydrogen species receiving side and a product synthesis side;
    (ii) providing a hydrogen species source at the hydrogen species receiving side;
    (iii) providing a second reactant source at the product synthesis side;
    (iv) providing a concentration gradient or a partial pressure differential of the hydrogen species source across the HSPM such that the concentration of hydrogen is lower on the product synthesis side than on the hydrogen species receiving side to thereby effect migration of the hydrogen species through the HSPM for reaction with the second reactant at or near the surface of the product synthesis side;

wherein at least the product synthesis side of the HSPM has a surface modification comprising a layer that is porous to the second reactant for promoting a reaction within the layer between the first and second reactants to form the product, and wherein the layer contains a plurality of triple phase reactive sites provided by a roughened surface, a metal species and a catalyst, the metal species and the catalyst being provided in a composition that is interspersed with the roughened surface.

2. The process of claim 1, wherein the roughened surface is an outer layer of the HSPM or a layer deposited on the HSPM, the roughened surface comprising a hydrogen species permeable metal, metal alloy, cermet or metal oxide thereof.

3. The process of claim 1, wherein the roughened surface is formed from a hydrogen permeable material selected from the group consisting of palladium, titanium nickel, an alloy of palladium, titanium, vanadium, zirconium, niobium, tantalum, or alloys of one or more from this group with silver, copper, chromium, iron, nickel or cobalt, and a cermet thereof.

4. The process of claim 1, wherein the roughened surface is a palladium sputtered surface.

5. The process of claim 1, wherein the metal species is a hydrogen species permeable metal, metal alloy, cermet or metal oxide thereof.

6. The process of claim 1, wherein the HSPM is formed from a hydrogen permeable material selected from the group consisting of palladium, titanium and nickel, an alloy of palladium, titanium and nickel, and a cermet thereof.

7. The process of claim 1, wherein the HSPM is a hydrogen permeable palladium membrane.

8. The process of claim 1, wherein the second reactant source is a nitrogen species source and the process is for synthesizing ammonia.

9. The process of claim 1, wherein the catalyst is an ammonia synthesis catalyst comprising an iron oxide based catalyst.

10. A hydrogen species selectively permeable solid membrane (HSPM) formed from a hydrogen permeable material selected from the group consisting of palladium, titanium and nickel, an alloy of palladium, titanium, vanadium, zirconium, niobium, tantalum or alloys of one or more from this group with silver, copper, chromium, iron, nickel or cobalt, and a cermet thereof, wherein at least one side of the membrane, or portion thereof, comprises a surface modification comprising a layer that is porous and contains within the layer a plurality of triple phase reactive sites provided by a roughened surface, a metal species and a catalyst, the metal species and the catalyst being provided in a composition that is interspersed with the roughened surface.

11. The membrane of claim 10, wherein the roughened surface is an outer layer of the HSPM or a further layer on the HSPM, the roughened surface comprising a hydrogen species permeable metal selected from the group consisting of palladium, titanium and nickel, an alloy of palladium, titanium and nickel, and a cermet thereof.

12. The membrane of claim 10, wherein the roughened surface is a metal sputtered surface comprising a metal selected from at least one of palladium, titanium and nickel.

13. The membrane of claim 10, wherein the metal species is a hydrogen species permeable metal, metal alloy, cermet or metal oxide thereof.

14. The membrane of claim 13, wherein the hydrogen species permeable metal, metal alloy, cermet or metal oxide thereof is selected from the group consisting of palladium and palladium oxide.

15. The membrane of claim 10, wherein the HSPM is a hydrogen permeable palladium membrane.

16. The membrane of claim 10, wherein the catalyst is an ammonia synthesis catalyst comprising an iron oxide based catalyst.

17. A reactor for synthesis of a product by reaction of at least a first reactant comprising a hydrogen species with a second reactant, the reactor comprising:

a first chamber section and a second chamber section separated by a hydrogen species selectively permeable solid membrane (HSPM) configured to provide a hydrogen species receiving side of the membrane in the first chamber section and a product synthesis side of the membrane in the second chamber section, wherein the HSPM is a surface modified membrane according to claim 10;

a first reactant inlet for supply of a first reactant source of a hydrogen species to the first chamber section;

a second reactant inlet for supply of a second reactant source to the second chamber section; and a first outlet for obtaining at least a product of the reaction.

18. A system for synthesis of a product by reaction of at least a first reactant comprising a hydrogen species with a second reactant, the system comprising:

a reactor according to claim 17; and a control means to control the concentration or partial pressure of hydrogen to be lower on the product synthesis side than on the hydrogen species receiving side, to thereby effect migration of the hydrogen species through the membrane to the product synthesis side for reaction with the second reactant to form the product.

* * * * *